Figure 1:
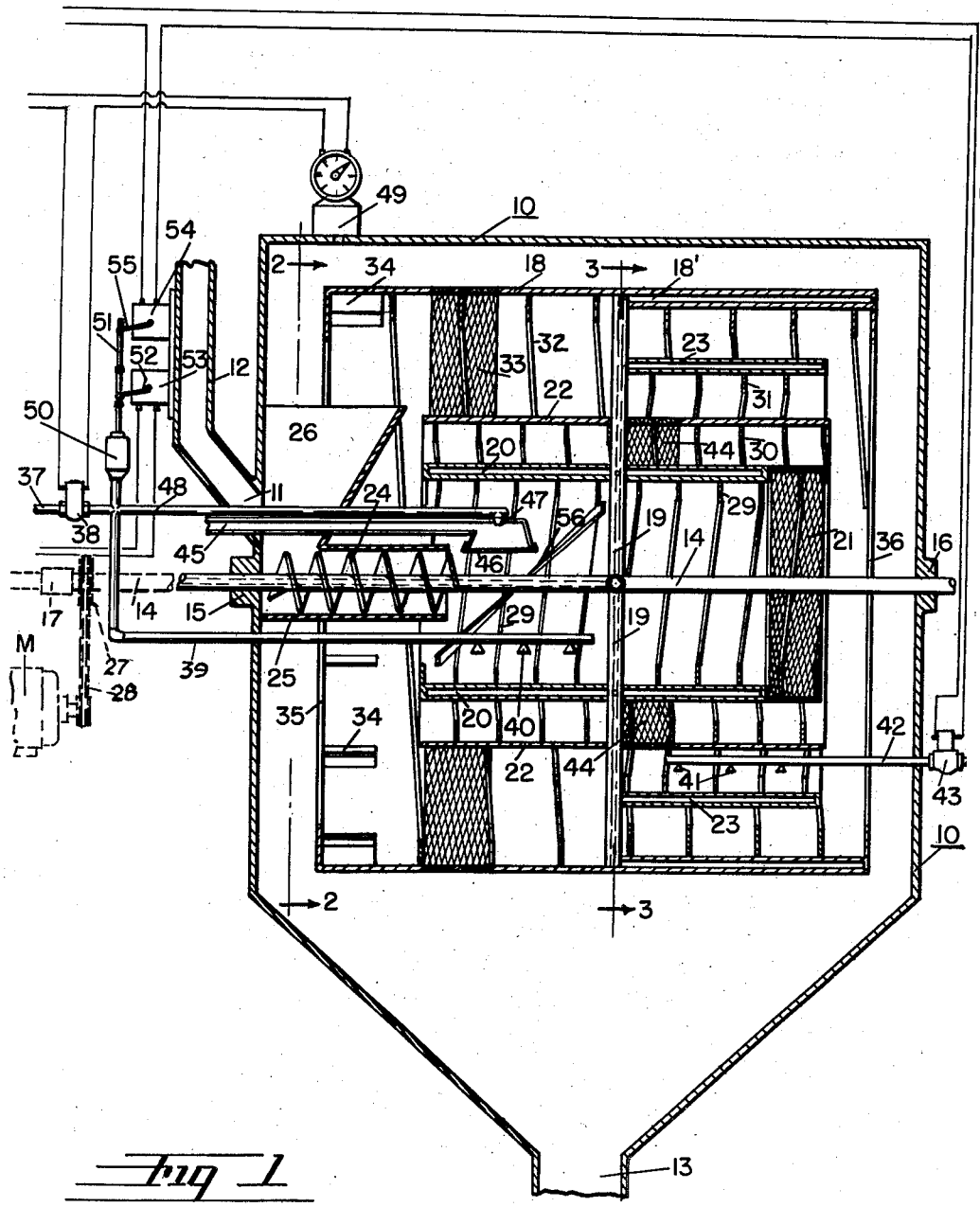

Dec. 2, 1958 G. E. HEILIG 2,862,805
DRY LIME ACETYLENE GENERATOR
Filed May 6, 1957 2 Sheets-Sheet 1

INVENTOR.
GEORGE E HEILIG
BY
*F.R. Geisler*
ATTORNEY

Dec. 2, 1958

G. E. HEILIG 2,862,805

DRY LIME ACETYLENE GENERATOR

Filed May 6, 1957

2 Sheets-Sheet 2

INVENTOR.
GEORGE E HEILIG
BY
*TA Geisler.*

ATTORNEY

United States Patent Office 2,862,805
Patented Dec. 2, 1958

2,862,805

DRY LIME ACETYLENE GENERATOR

George E. Heilig, Portland, Oreg.

Application May 6, 1957, Serial No. 657,068

9 Claims. (Cl. 48—33)

This invention relates to the production of acetylene gas through the gasification of calcium carbide by bringing the calcium carbide into contact with water, and the invention relates more particularly to the type of acetylene gas generators in which regulated amounts of water and calcium carbide are mixed in a closed container of substantial size causing the generated gas to build up pressure in the container for delivery under controlled pressure therefrom.

The generating of acetylene gas by the action of water on the calcium carbide leaves a residue of calcium hydroxide (lime). This residue has heretofore commonly been in the form of a sludge as a result of excess water used in the process in the endeavor to obtain maximum gas output from the calcium carbide. The lime in this sludge has commercial value but it is necessary to dry the sludge in order to bring the lime into commercial dry condition. The cost of drying the sludge for this purpose is so high, in comparison with the value of the lime obtained, that the handling of this by-product is not very profitable.

An object of the present invention is to provide an improved acetylene generator from which the lime residue will be delivered in substantially dry condition so as to be salable without any further drying or processing.

Another object of the invention is to provide an improved acetylene generator which will be capable of operating at maximum gas-generating efficiency in spite of the fact that the lime residue produced therefrom is delivered in a commercially dried state instead of in the form of sludge, as heretofore customary.

A further object of the invention is to provide an improved acetylene gas generator of the type indicated in which the calcium carbide will be caused to travel over a considerably prolonged path while being subjected to contact with the water so as to extend the period during which the generating of the gas is given a favorable opportunity of taking place, without, however, increasing the overall size of the generator.

A still further object of the invention is to provide an acetylene generator in which the larger particles of calcium carbide, which require a longer period of time for gasification, will automatically be recirculated and subjected to repeated contact with water until their gasification is completed.

An additional object of the invention is to provide a generator of the character indicated in which the lime, together with the smaller particles of calcium carbide, will gradually be separated out from the larger particles of calcium carbide at stages along their course in the generator in order that the smaller particles of calcium carbide can be completely utilized before the final separating out of the lime residue.

A related object is to provide means whereby the larger pieces of calcium carbide, which will require recirculation through the generator, will also act as an aid in withdrawing moisture from the lime residue before the discharge of the residue from the generator takes place.

Another object of the invention is to provide an improved generator of the character described in which the amount of fresh calcium carbide introduced into the generator during its operation will be automatically controlled, and in which the delivery of water into the generator for the gasification of the calcium carbide will be automatically controlled by the gas pressure developed within the generator.

Figure 2:
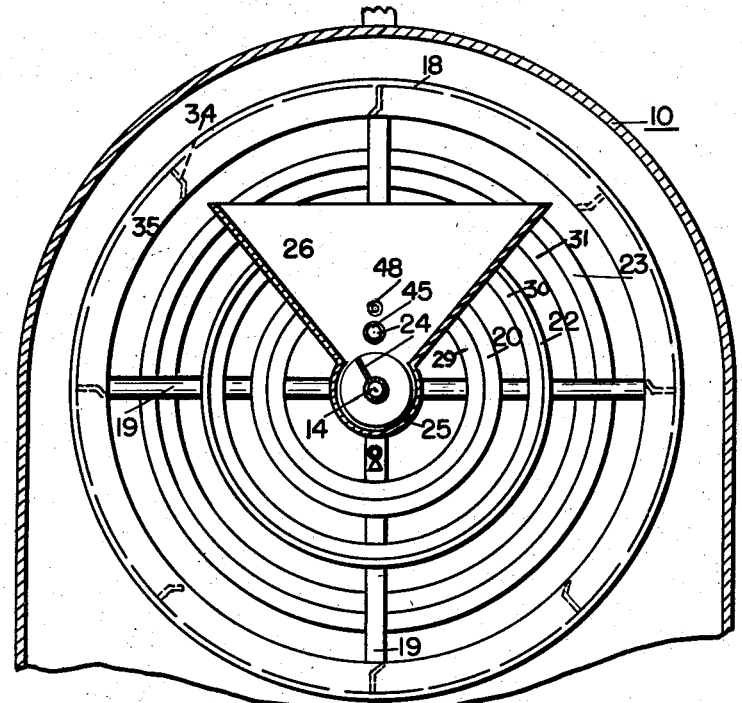
Figure 3:
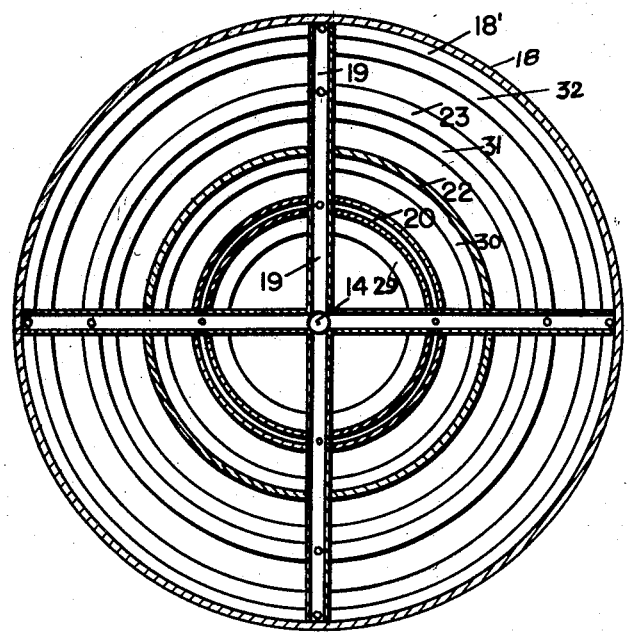

The manner in which these objects and other advantages, hereinafter mentioned, are attained with the generator of the present invention, and the construction and operation of the generator, will be briefly explained and described with reference to the accompanying, partly diagrammatic drawings, wherein:

Figure 1 is a sectional elevation of the device taken along the axis of rotation of the rotating cylinders or drums in the same; and Figures 2 and 3 are transverse sectional elevations taken on the lines indicated at 2—2 and 3—3 respectively in Figure 1.

Referring first to Figure 1, the reference 10 indicates the closed housing or casing for the entire generator, this housing being supported in stationary position by suitable means (not shown). The housing 10 has a feed inlet opening 11 through which calcium carbide from external hoppers (not shown), passing down a delivery pipe 12 passes into the housing, and the housing 10 has a bottom discharge outlet 13 through which the dry lime residue is discharged, as later explained.

A pipe 14 extends through the housing 10, being rotatably supported in bearings 15 and 16 mounted in opposite end walls of the housing. Suitable seals (not shown) are provided in these bearings to prevent the escape of gas from the housing 10 at these points. Preferably, but not necessarily, the upper portion of the housing 10 is semi-cylindrical in shape with the pipe 14 forming the axis of the upper semi-cylindrical portion.

At the left of the housing 10, as viewed in Figure 1, the pipe 14 is connected, by means of a rotary joint 17, with another pipe delivering a constant supply of cold water, which water serves as the cooling medium for the generator, as later explained.

An outer cylindrical drum 18 is supported on the pipe 14 by means of tubular radial arms or spokes 19 which are rigidly secured to the pipe 14 and through which water from the pipe 14 passes. That portion of the drum 18 which extends to the right of the supporting hollow spokes 19 (as viewed in Figure 1) is formed into a cylindrical water jacket 18′ and cooling water is supplied to this jacket through the hollow spokes 19 from the pipe 14.

An inner first drum 20, most of the cylindrical surface of which is formed into a water jacket, is also supported on the hollow spokes 19, and its water jacket similarly is supplied with water from the pipe 14 through the spokes 19. This inner drum 20 terminates at the right, as viewed in Figure 1, in a portion in which a mesh screen 21 constitutes the cylindrical wall in place of the water jacket.

A second drum 22 surrounds the inner drum 20, is coaxial therewith, and similarly is supported by the hollow spokes 19. This second drum 22 has the same longitudinal length as the inner drum 20, both drums being shorter in length than the outer drum 18, as apparent from Figure 1. This drum 22, however, is not provided with a water jacket.

A third inner drum 23, the length of which is approximately only half the length of the drums 20 and 22, surrounds the right hand half of the drum 22 (as viewed in Figure 1), is coaxial with the other drums, is similarly supported by the hollow spokes 19, and its cylindrical surface consists of a water jacket similarly supplied with water from the pipe 14 through the spokes 19.

Thus, as the pipe 14 rotates, the drums 20, 22, 23 and 18 are rotated in unison with the pipe.

An auger blade 24 is secured on the pipe 14 and extends along the pipe 14 inside the housing 10 from the left end of the housing 10 to a point located a short distance within the inner drum 20. A stationary tube 25, secured to the end wall of housing 10, surrounds the auger 24 so as to provide a channel in which the auger operates. A hopper 26 is mounted on the end wall of the housing 10 and has a bottom opening leading into the tube 25. The inlet 11 into the housing 10 is located in the lower portion of the hopper 26 above the tube 25 as shown. The top of the hopper 26 is open, and, as shown in Figure 1, the top portion of the hopper extends out into the adjacent end zone of the outer drum 18 but does not extend to the other drums.

A sprocket 27 is secured on the pipe 14 outside of the housing 10, and is connected by a sprocket chain 28 with a drive sprocket driven from the motor M. Through this medium operation of motor M rotates the pipe 14 and, with it, the auger 24 and the drums 20, 22, 23 and 18. Water passing into the pipe 14 is finally discharged from the right hand end of the pipe 14 beyond the housing 10.

A continuous spiral fin 29 is secured on the interior surface of the inner drum 20 and extends from one open end of the drum to the other. Both the auger 24 and this spiral fin 29 are so arranged that, as the pipe 14, auger and drums are rotated (in clockwise direction as viewed from the right in Figure 1), the calcium carbide, which passes down into the tube 25 from the hopper 26 will be moved along the tube 25 until it reaches the inner end of the tube, from whence it will drop down into the inner drum 20, and then continue its travel along in the drum 20 in the same direction (from left to right).

An additional inner fin 56 (Figure 1) is arranged spirally within the drum 20 extending along across the inner edges of the fin 29. This fin has a greater slope or pitch than the fin 29, and engages the pieces of carbide which extend above the edges of the fin 29, so as to move them more rapidly along in the drum 20, as later explained.

A spiral fin 30 similar to spiral fin 29 is mounted on the inner face of the second drum 22 but extends in an opposite direction from spiral fin 29 so that material deposited in drum 22 will travel in an opposite direction from that in drum 20 (and thus from right to left as viewed in Figure 1). The third drum 23 is similarly equipped with a spiral fin 31 extending in the same direction as the spiral fin 29 of the drum 20, while the outer drum 18 has a spiral fin 32 which extends in the same direction as the fin 30 on drum 22 and thus causes material in drum 18 to move from right to left upon the rotation of the drum.

The outer drum 18 has a portion of its wall formed by a mesh screen 33 located in the relative position shown in Figure 1. Beyond the screen 33, at the left end of the outer drum 18, a series of cups 34 are mounted on the inside of the drum. The purpose of these cups 34, as apparent from Figure 1, is to collect the material (calcium carbide) arriving at the left end of the drum 18 and then dump this calcium carbide back into the hopper 26 as the drum rotates. An inwardly-extending flange 35 on the left end of drum 18 prevents any of the material at that end of the drum from dropping out of the drum into the bottom of housing 10 and similarly the opposite or right hand end of the drum 18 is provided with a flange 36 for the same reason.

Water for mixing with the calcium carbide in the generator is supplied from one source through a pipe 37 which is controlled by a valve 38. A branch pipe 39 conducts the water to a series of primary spray heads 40 which are positioned within the inner drum 20, as shown, so as to spray water onto the calcium carbide as soon as it is deposited in the drum 20 from the auger tube 25.

A secondary series of spray heads 41 is positioned in the drum 31 and is supplied with water by another pipe 42 controlled by valve 43.

The operation of the generator, as thus far described, is, in brief, as follows:

Calcium carbide from the hopper 26 passes into the tube 25 and is delivered into the left hand end of the drum 20 by the operation of the auger 24, and, when deposited in the drum 20, receives water from the spray heads 40. The mixture is moved toward the right in the drum 20 by the rotation of the drum, due to the engagement of the mixture by the spiral fin 29. The pieces of carbide which extend up beyond the edges of the fin 29 will at the same time be engaged by the additional inner fin 56 and moved along more rapidly because of the greater slope or pitch of the fin 56. The result is that the smaller pieces of carbide collect at the bottom of the mixture and are moved by the fin 29 while the pieces which continue to be engaged by the fin 56 will average larger in size. This partial separation of the material according to size enables the smaller particles to receive more water in the bottom of the rotating drum 20 while traveling more slowly and consequently results in greater utilization of the smaller particles for gas production at the outset of the course through the generator.

When the calcium carbide in the drum 20 reaches the screen portion 21 of the drum the finer particles of calcium carbide and any lime particles produced from the action of the water on the calcium carbide will drop through the screen onto the second drum 22. The larger pieces of calcium carbide, on which further action by water is required, will pass over the screen 21 and drop from the end of the drum 20 down onto the end of the outer drum 18.

The particles of calcium carbide and lime, which drop through the screen 21 onto the second drum 22, travel from right to left in the drum 22. A portion of the cylindrical wall of drum 22 is formed by a mesh screen 44 which is positioned above the left end of the third drum 31. Consequently the lime and those particles of calcium carbide which are small enough to pass through screen 44 then drop onto drum 23, while the particles of calcium carbide which are too large to pass through screen 44 move onto the left end of drum 22 and thence drop onto the outer drum 18.

The small particles of calcium carbide, together with the lime particles, which have been deposited on drum 23, move again to the right on that drum while receiving additional water from the secondary spray heads 41. This gives the small particles of calcium carbide at this stage further opportunity to become gasified. The residue, which will be mostly lime at the end of this stage, drops from the right hand end of drum 31 onto the outer drum 18. At this point this residue is mixed with the larger pieces of calcium carbide which have dropped off of the right hand end of the inner drum 20. No further water is added to the material on drum 18, and the contact of the larger pieces of the calcium carbide with the lime particles causes the calcium carbide now to absorb most of the water from the lime particles. This mixture moves to the left on the outer drum 18 until it reaches the screen portion 33. By this time the lime will be substantially dry while the remaining pieces of calcium carbide will also be substantially dry in addition to being too large to pass through the screen 33. Consequently, the lime particles, in substantially dry condition, pass down through the screen 33 into the bottom of the housing 10. The unused calcium carbide moves on the left end of the drum 18, being joined by the particles of unused calcium carbide from the left end of drum 22, and finally are collected by the cups 34 and deposited back in hopper 26 for recirculation in the generator.

Gas generated from the calcium carbide in the generator is discharged through the outlet tube 45. The intake end of this outlet tube is covered with a fine screen or filter cloth 46 to prevent the possibility of any fine particles of the calcium carbide from being discharged with the gas, and a water spray head 47 is positioned above the filter cloth 46 in the intake end to keep the filter cloth clear. Water for the spray head 47 is supplied through branch pipe 48.

The valve 38 for the water supply pipe is electrically operated and is controlled by a pressure-operated switch assembly 49 sensitive to the pressure within the housing 10. This switch assembly 49, which is of standard construction, can be set so that the switch will be closed when the pressure reaches a predetermined low level and opened when the pressure reaches a predetermined high level. Thus when the gas pressure in the generator drops to the predetermined minimum, the water control valve 38 is opened causing the water to be delivered to the primary spray heads 40 of the generator. The shutting off of the water to the generator will, of course, cause the generating of gas in the generator to cease as soon as the water in the generator is used up.

The opening of the water valve 38 causes a water pressure piston to be moved to raised position in a cylinder 50. This movement of the piston raises a rod 51. An actuating arm 52 of the switch control 53 is connected to the rod 51. The arrangement is such that the raising of the rod 51 immediately starts the operation of motor M and the lowering of the rod will cause the motor to be shut off at the expiration of a predetermined period following the lowering of the rod. Thus the motor M causes the auger 24 and the drums in the generator to start rotating immediately as soon as the water from the pipe 37 is turned on and this rotation continues for a short time after the water from the pipe 37 has been turned off.

The valve 43, controlling the passage of water through the pipe 42 to the secondary spray heads 41, is electrically operated from a switch control 54. The actuating arm 55 of this switch control 54 is also connected with the rod 51. The switch control 54 operates with a delayed action in both directions. In other words, there is a predetermined period of delay from the time the arm 55 is raised before the switch control 54 acts to open the valve 43 and similarly there is a delay after the arm 55 has been lowered before the valve 43 is turned off.

Preferably the calcium carbide is supplied to the delivery pipe 12 from two outside hoppers (not shown) which can be shut off separately so as to enable either hopper to feed the generator while the other is being filled. The calcium carbide from either or both of these hoppers passes down through the pipe 12 to the bottom of the inside hopper 26 and such passage is regulated by the amount of calcium carbide in the hopper 26.

In this way the calcium carbide from the outside, together with any calcium carbide which requires recirculation in the generator for complete utilization for gas generating purposes, is moved through the series of drums in the manner described, receiving the main and initial supply of water at the start of the course, with the subsequent smaller particles of the calcium carbide receiving a supplementary treatment with water during the course, so that the latter will be completely utilized for gas generating; and at the same time some of the larger portions of the calcium carbide which will require recirculation, also serve the additional purpose of aiding in the drying of the lime residue before the latter is discharged from the generator. All this takes place while the generator is automatically controlled by the pressure of the gas within the generator.

It will be noted that in those parts of the device where the calcium carbide is contacted by the water, and thus at points where the most heat would be developed, water jackets are provided and these are cooled by a constant flow of separate cooling water, an arrangement which prevents any dangerous overheating.

Also it will be noted that, when the generator starts operating, the water to the primary spray heads 40 will be turned on while the water to the secondary spray heads 41 is not turned on until the calcium carbide has had sufficient time to reach the location of the spray heads 41. Similarly, when the operation of the device is to cease, the water to the main spray heads 40 is immediately shut off but the spray heads 41 continue to function for an interval sufficient to enable the calcium carbide which has already received water in drum 20 and is capable of passing through screen 21 to pass through the field of the secondary spray heads 41. Furthermore, when the operation of the device is to cease, the drums nevertheless continue to rotate for sufficient period to enable the calcium carbide which has already had contact with water to complete its course, so that all the calcium carbide remaining in the device after its operation has ceased will be dry and therefore inactive.

The gas pressure under which the device operates can be varied if desired, to suit conditions. However, the pressure of 2 to 3 pounds per square inch is considered as a preferred pressure range for normal operating conditions. With such pressure and with all excessive heating of the device prevented by the water cooling system, the generator operates under maximum conditions of safety.

It would be possible of course to make minor modifications in the device structure without departing from the principle of the invention, and the number of coaxial drums could be changed depending upon the size of the generator, the axial length of the drums, etc. It is not intended that the device should be limited exactly to the construction shown or the invention otherwise limited except as set forth in the claims.

I claim:
1. In an acetylene generator, a housing, an inner drum in said housing, an outer drum in said housing coaxial with said inner drum and spaced outwardly therefrom the axial length of said outer drum exceeding that of said inner drum and the ends of said outer drum extending beyond the corresponding ends of said inner drum, means for rotating said drums, a calcium carbide hopper in said housing, means for delivering calcium carbide from the bottom of said hopper into the receiving end of said inner drum, means in said inner drum for moving material from said receiving end to the opposite end of said inner drum as said inner drum is rotated, means for delivering water into said receiving end of said inner drum, means in said outer drum for moving material delivered into said outer drum oppositely from that in said inner drum, whereby material dropping off from said opposite end of said inner drum onto said outer drum will then move along through said outer drum, a screen forming a portion of the cylindrical wall of said outer drum near the end of the course of said material in said outer drum, whereby fine lime particles resulting from gas generation will, upon reaching said screen, drop through said screen into the bottom of said housing, and a series of cups on the inside of said outer drum beyond said screen, said cups passing above the top of said hopper with the rotation of said outer drum, whereby material which has not been completely utilized for gas generation when reaching said cups will be returned to said hopper for renewed travel through said drums.

2. In a dry lime acetylene generator of the character described, a housing, an inner drum in said housing, an outer drum in said housing coaxial with said inner drum and spaced outwardly therefrom, the axial length of said outer drum exceeding that of said inner drum and the ends of said outer drum extending beyond the corresponding ends of said inner drum, means for rotating said drums in unison, a calcium carbide hopper in said housing at one end, a delivery chute leading into the lower portion of said hopper from the outside of said housing, means for delivering calcium carbide from the bottom of said hopper into the receiving end of said inner drum, a spiral fin in said inner drum for moving material from said receiving end to the opposite end of said inner drum as said drum is rotated, means for delivering water into said inner drum, a spiral fin in said outer drum for moving material delivered into said outer drum oppositely from that in said inner drum, whereby material dropping off from said inner drum onto said outer drum will then move along through said outer drum, a screen forming a portion of the cylindrical wall of said outer drum near the end of the course of said material in said outer drum, whereby fine lime particles resulting from gas generation will, upon reaching said screen, drop through said screen into the bottom of said housing and said lime particles will be substantially dry as a result of the prolonged travel of said material through both drums, and a series of cups on the inside of the end of said outer drum beyond said screen, said cups passing above the top of said hopper with the rotation of said outer drum, whereby the material which has not been completely utilized for gas generation when reaching said cups will be returned to said hopper for renewed travel through said drums.

3. In an acetylene generator of the character described, a closed housing, a gas-discharging pipe leading from said housing, a lime-discharging outlet in said housing, a rotating water pipe extending through said housing, said rotating pipe connected with a source of cooling water, means for rotating said rotating pipe, an inner drum in said housing, an outer drum in said housing coaxial with said inner drum and spaced upwardly therefrom, the axial length of said outer drum exceeding that of said inner drum and the ends of said outer drum extending beyond the corresponding ends of said inner drum, hollow radial arms extending from said rotating water pipe and supporting said drums, water jackets on said drums connected with said rotating water pipe by said hollow arms, a calcium carbide hopper in said housing at one end, a delivery chute leading into the lower portion of said hopper from the outside of said housing, means for delivering calcium carbide from the bottom of said hopper into the receiving end of said inner drum, a rotating auger in said means, said auger and said drums rotated in unison, a spiral fin in said inner drum for moving material from said receiving end to the opposite end of said inner drum as said drum is rotated, means for delivering a water spray into said receiving end of said inner drum, a spiral fin in said outer drum for moving material delivered into said outer drum oppositely from that in said inner drum, whereby material dropping off from said opposite end of said inner drum onto said outer drum will then move along through said outer drum, a screen forming a portion of the cylindrical wall of said outer drum near the end of the course of material in said outer drum, whereby fine lime particles resulting from gas generation will, upon reaching said screen, drop through said screen into the bottom fo said housing, and a series of cups on the inside of said outer drum beyond said screen, said cups passing above the top of said hopper with the rotation of said outer drum, whereby material which has not been completely utilized for gas generation when reaching said cups will be returned to said hopper for renewed travel through said drums.

4. In an acetlyene generator, a closed housing, a gas-discharging pipe leading from said housing, a rotating water pipe extending through said housing, bearing seals in the opposite end walls of said housing for said rotating pipe, said rotating pipe connected with a source of cooling water, a motor outside of said housing for rotating said rotating pipe, an inner drum in said housin, an outer drum in said housing coaxial with said inner drum and spaced outwardly therefrom, the axial length of said outer drum exceeding that of said inner drum and the ends of said outer drum extending beyond the corresponding ends of said inner drum, hollow radial arms extending from said rotating water pipe and supporting said drums, a calcium carbide hopper in said housing, a delivery chute leading into the lower portion of said hopper from the outside of said housing, means for delivering calcium carbide from the bottom of said hopper into the receiving end of said inner drum, an auger blade in said means, said auger blade mounted on said rotating pipe, whereby said auger will be rotated in unison with said drums, a spiral fin in said inner drum for moving material from said receiving end to the opposite end of said inner drum as said drum is rotated, means for delivering a water spray into said receiving end of said inner drum, a control valve for said water spray delivery means, a pressure-sensitive device actuated by the gas pressure within said housing operating said control valve, whereby said control valve will be automatically closed when the pressure in said housing reaches a predetermined maximum and opened when said pressure drops to a predetermined minimum, a spiral fin in said outer drum for moving material delivered into said outer drum oppositely from that in said inner drum, whereby material dropping off from said opposite end of said inner drum onto said outer drum will then move along through said outer drum, a screen forming a portion of the cylindrical wall of said outer drum near the end of the course of said material in said outer drum, whereby fine lime particles resulting from gas generation will, upon reaching said screen, drop through said screen into the bottom of said housing and said lime particles will be substantially dry as a result of the prolonged travel of said material through both of said drums, a series of cups on the inside of the end of said outer drum beyond said screen, said cups passing above the top of said hopper with the rotation of said outer drum, whereby material which has not been completely utilized for gas generation when reaching said cups will be returned to said hopper for renewed travel through said drums, and an automatic control for said motor causing said motor to operate when the gas pressure in said housing opens said water control valve and causing said motor to cease operating after a short interval following the closing of said water control valve.

5. The combination set forth in claim 4 with the addition of an intermediate drum positioned between and coaxial with said inner and said outer drums and rotated in unison with them, a screen forming the discharging end portion of said outer drum, whereby material passing through said latter-mentioned screen will drop onto said intermediate drum and material too large to pass through said latter-mentioned screen will drop onto said outer drum, and a spiral fin on said intermediate drum extending in a direction opposite from said fin on said inner drum.

6. The combination set forth in claim 4 with the addition of an intermediate drum positioned between and coaxial with said inner and said outer drums and rotated in unison with them and also supported by said radial arms from said rotating water pipe, the axial length of said intermediate drum corresponding approximately to that of said inner drum, a screen forming the discharging end portion of said inner drum, whereby material passing through said latter-mentioned screen will drop onto said intermediate drum and material too large to pass through said latter-mentioned screen will drop onto said outer drum, a spiral fin on said intermediate drum extending in a direction opposite from said fin on said inner drum, and a second intermediate rotating drum positioned between said first-mentioned intermediate drum and said outer drum, a screen forming a portion of the cylindrical wall of said first-mentioned intermediate drum, said last mentioned screen discharging onto said second intermediate drum, and a spiral fin on said second intermediate drum extending oppositely from the spiral fin of said first intermediate drum, said second intermediate drum discharging onto said outer drum.

7. The combination set forth in claim 4 with the addition of an intermediate drum positioned between and coaxial with said inner and said outer drums and rotated in unison with them and also supported by said radial arms from said rotating water pipe, the axial length of said intermediate drum corresponding approximately to that of said inner drum, a screen forming the discharging end portion of said inner drum, whereby material passing through said latter-mentioned screen will drop onto said intermediate drum and material too large to pass through said latter-mentioned screen will drop onto said outer drum, a spiral fin on said intermediate drum extending in a direction opposite from said fin on said inner drum, a second intermediate rotating drum positioned between a portion of said last mentioned intermediate drum and said outer drum, a screen forming a portion of the cylindrical wall of said first intermediate drum, said last mentioned screen discharging onto said second intermediate drum, a spiral fin on said second intermediate drum extending oppositely from the spiral fin of said first intermediate drum, second water spray delivery means in said second intermediate drum, said second intermediate drum discharging onto said outer drum, and an automatic control for said second water spray delivery means causing said second spray means to be turned on a short time after the start of said motor and to be turned off a short time before the turning off of said motor.

8. The combination set forth in claim 4 with the addition of a second inner spiral fin in said inner drum extending along the inner edge of said first mentioned fin and having a greater pitch than said first mentioned fin, whereby said second inner spiral fin will move larger pieces of calcium carbide to the discharging end of said inner drum while allowing more opportunity for the mixing of water with the smaller pieces of calcium carbide in said inner drum, an intermediate drum positioned between and coaxial with said inner and said outer drums and rotated in unison with them and also supported by said radial arms from said rotating water pipe, the axial length of said intermediate drum corresponding approximately to that of said inner drum, a screen forming the discharging end portion of said inner drum, whereby material passing through said latter-mentioned screen will drop onto said intermediate drum and material too large to pass through said latter-mentioned screen will drop onto said outer drum, a spiral fin on said intermediate drum extending in a direction opposite from said first-mentioned fin on said drum, a second intermediiate rotating drum positioned between said first-mentioned intermediate drum and said outer drum, a screen forming a portion of the cylindrical wall of said first intermediate drum, said last-mentioned screen discharging onto said second intermediate drum, a spiral fin on said second intermediate drum extending oppositely from the spiral fin of said first intermediate drum, said second intermediate drum discharging onto said outer drum, and a second water spray delivery means in said second intermediate drum.

9. A dry lime acetylene generator including a closed housing, a gas-discharging pipe leading from said housing, a filter and a filter-cleaning water spray at the entrance into said gas-discharging pipe, a lime-discharging outlet at the bottom of said housing, an inner drum in said housing, an outer drum in said housing coaxial with said inner drum and spaced outwardly therefrom, the axial length of said outer drum exceeding that of said inner drum and the ends of said outer drum extending beyond the corresponding ends of said inner drum, a motor for rotating said drums in unison, a calcium carbide hopper in said housing, a delivery chute leading into the lower portion of said hopper from the outside of said housing, means for delivering calcium carbide from the bottom of said hopper into the receiving end of said inner drum, a spiral fin in said inner drum for moving material from said receiving end to the opposite end of said inner drum as said drum is rotated, means for delivering water into said inner drum, a control valve for said water delivery means, a pressure-sensitive device actuated by the gas pressure within said housing operating said water control valve, whereby said control valve will be automatically closed when the pressure in said housing reaches a pre-determined maximum and opened when said pressure drops to a pre-determined minimum, a spiral fin in said outer drum for moving material delivered into said outer drum oppositely from that in said inner drum, a screen forming a portion of the cylindrical wall of said outer drum near the end of the course of said material in said outer drum, whereby fine lime particles resulting from gas generation will, upon reaching said screen, drop through said screen into the bottom of said housing, a series of cups on the inside of said outer drum beyond said screen, said cups passing above the top of said hopper with the rotation of said outer drum, whereby material which has not been completely utilized for gas generation when reaching said cups will be returned to said hopper for renewed travel through said drums, an intermediate drum positioned between and coaxial with said inner and said outer drums, the length of said intermediate drum corresponding with that of said inner drum, a screen forming the discharging end of said inner drum, said screen discharging onto said intermediate drum, a spiral fin on said intermediate drum extending in a direction opposite said fin on said inner drum, a second intermediate drum positioned between said first-mentioned intermediate drum and said outer drum, a screen forming a portion of the cylindrical wall of said first intermediate drum, said last mentioned screen discharging onto said second intermediate drum, a spiral fin on the second intermediate drum extending oppositely from the spiral fin on said first intermediate drum, second water delivery means in said second intermediate drum, an automatic control for said motor causing said motor to operate when the gas pressure in said housing opens said water-control valve and causing said motor to cease operating after a short interval following the closing of said water-control valve, and a separate automatic control for said second water delivery means causing said water delivery means to be turned on a short time after the starting of said motor and to be turned off a short time before the stopping of said motor.

<center>No references cited.</center>